(12) United States Patent
Chuang et al.

(10) Patent No.: US 7,703,316 B2
(45) Date of Patent: Apr. 27, 2010

(54) VALVE STEM ASSEMBLY FOR TIRE PRESSURE DETECTING SYSTEMS

(75) Inventors: Kuo-Chih Chuang, Fongyuan (TW); Hung-Chih Yu, Taichung (TW)

(73) Assignee: Orange Electronic Co., Ltd., Taichung Hsien (TW)

( * ) Notice: Subject to any disclaimer, the term of this patent is extended or adjusted under 35 U.S.C. 154(b) by 46 days.

(21) Appl. No.: 12/283,719

(22) Filed: Sep. 15, 2008

(65) Prior Publication Data

US 2010/0064792 A1    Mar. 18, 2010

(51) Int. Cl.
    *B60C 23/02*    (2006.01)
(52) U.S. Cl. .................................... 73/146.8
(58) Field of Classification Search ........... None
    See application file for complete search history.

(56) References Cited

U.S. PATENT DOCUMENTS

| 7,168,305 B2* | 1/2007 | Narayanaswamy | 73/146 |
| 7,441,452 B2* | 10/2008 | Phalak et al. | 73/146 |
| 2005/0087007 A1* | 4/2005 | Uleski | 73/146 |
| 2005/0132793 A1* | 6/2005 | Narayanaswamy | 73/146.8 |
| 2006/0248947 A1* | 11/2006 | Phalak et al. | 73/146 |
| 2007/0022806 A1* | 2/2007 | Narayanaswamy | 73/146.8 |

* cited by examiner

*Primary Examiner*—Andre J Allen
(74) *Attorney, Agent, or Firm*—William E. Pelton, Esq.; Cooper & Dunham LLP

(57) ABSTRACT

A valve stem assembly for tire pressure detecting systems has a valve stem, a connector and a tire pressure detector. The valve stem is conductive. The connector is connected coaxially on the valve stem and is conductive and has a connecting section. The connecting section has an adjusting slot and a domical end. The adjusting slot is formed through the connecting section. The tire pressure detector has at least one tab and at least one conducting washer, the at least one tab protrudes from the tire pressure detector, corresponds to and is adjustably mounted on the connecting section. The at least one tab has a tab slot being formed therethrough. A bolt assembly is mounted in the tab slot and the adjusting slot to hold the tire pressure detector on the connector.

11 Claims, 6 Drawing Sheets

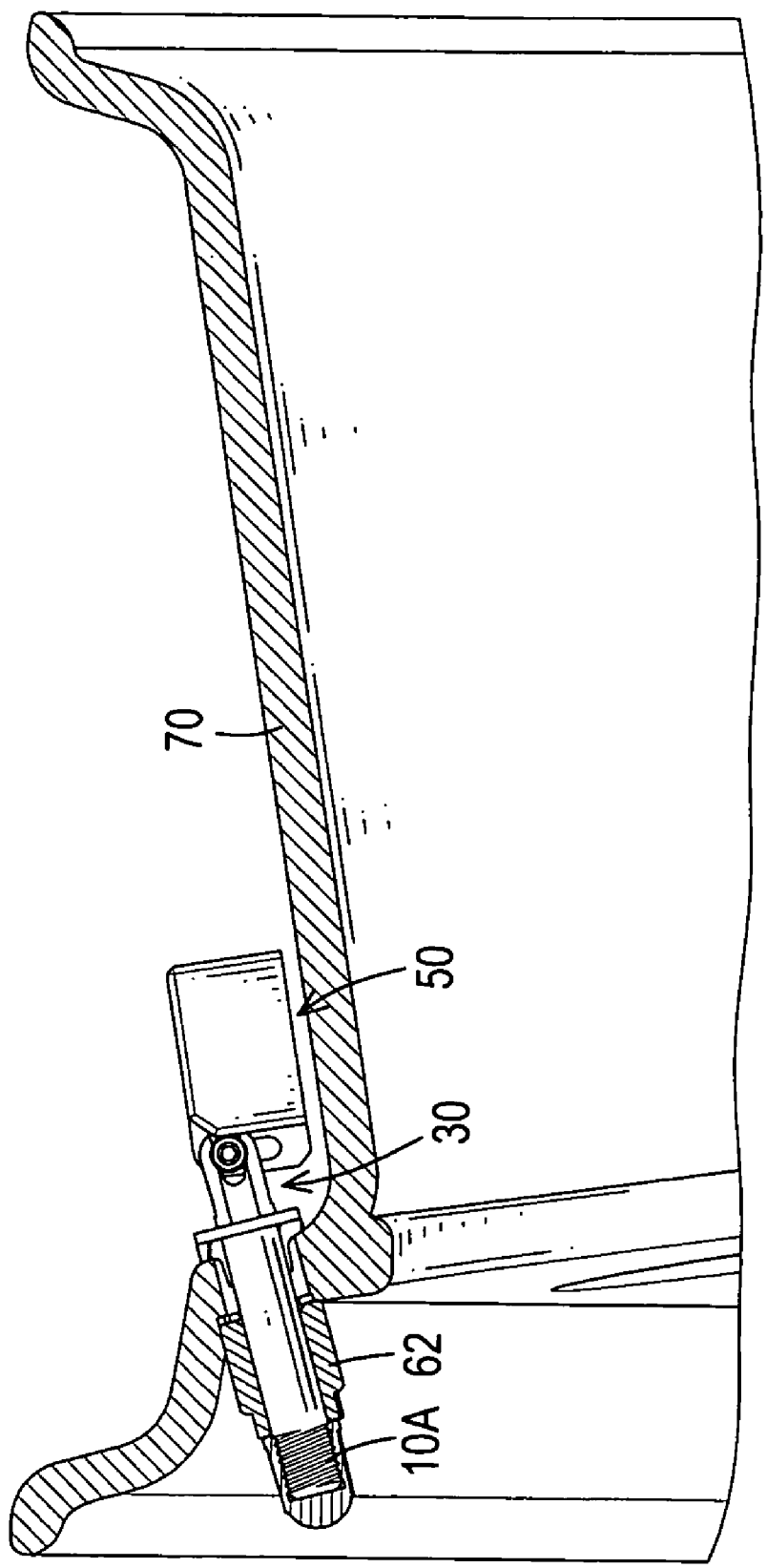

VALVE STEM ASSEMBLY FOR TIRE PRESSURE DETECTING SYSTEMS

BACKGROUND OF THE INVENTION

1. Field of Invention

The present invention relates to a valve stem, and more particularly to a valve stem assembly for tire pressure detecting systems.

2. Description of the Related Art

Car electronics, such as antilock brake system (ABS), electronic brake distribution (EBD), Electronic Power Steering (EPS), central control system, electric panel, electronic anti-slip control box, tire pressure monitoring system (TPMS) or the like, have been recently invented and introduced because people care about driving safety. Various TPMSs may be applied for monitoring air pressure inside tires of a vehicle to alert a driver of abnormal tire pressure or to easily check correct tire pressures are set and comprises a tire pressure detector connected to an inner end of a valve stem.

To improve adjustability of a tire pressure detector on the valve stem for rims with different shapes, a conventional tire pressure detector has a pintle and is pivotally mounted on the valve stem using the pintle. The pintle is mounted on the tire pressure detector using fasteners after being mounted through the tire pressure detector and the valve stem. The tire pressure detector is then moveably and rotatably mounted on the valve stem and the tire pressure detector may be easily adapted to fit different rims. Although the tire pressure detector may be installed on valve stems mounted on rims with different shapes, the tire pressure detector is easily broken since the tire pressure detector is not locked in position on the valve stem after installation so is left free to vibrate, bang or knock causing damage.

The present invention provides a valve stem assembly for tire pressure detecting system to obviate or mitigate the shortcoming of the conventional valve stem with the tire pressure detector.

SUMMARY OF THE INVENTION

The primary objective of the present invention is to provide a valve stem assembly for tire pressure detecting systems having a bolt assembly and a connector that are used to connect a tire pressure detector and a valve stem to provide multi-dimensional adjustability of the tire pressure detector.

The valve stem assembly for tire pressure detecting systems has a valve stem, a connector and a tire pressure detector. The valve stem is conductive. The connector is connected coaxially to the valve stem and is conductive and has a connecting section. The connecting section has an adjusting slot and a domical end. The adjusting slot is formed through the connecting section. The tire pressure detector has a tab assembly and at least one conducting washer. The tab assembly protrudes from the tire pressure detector, corresponds to and is adjustably mounted on the connecting section. The tab assembly has a tab slot being formed therethrough. A bolt assembly is mounted in the tab slot and the adjusting slot to hold the tire pressure detector on the connector.

Other objectives, advantages and novel features of the invention will become more apparent from the following detailed description when taken in conjunction with the accompanying drawings.

BRIEF DESCRIPTION OF THE DRAWINGS

FIG. 6 is a side view in partial section of the valve stem assembly for tire pressure detecting system in FIG. 5.

DETAILED DESCRIPTION OF THE INVENTION

Figure 1:
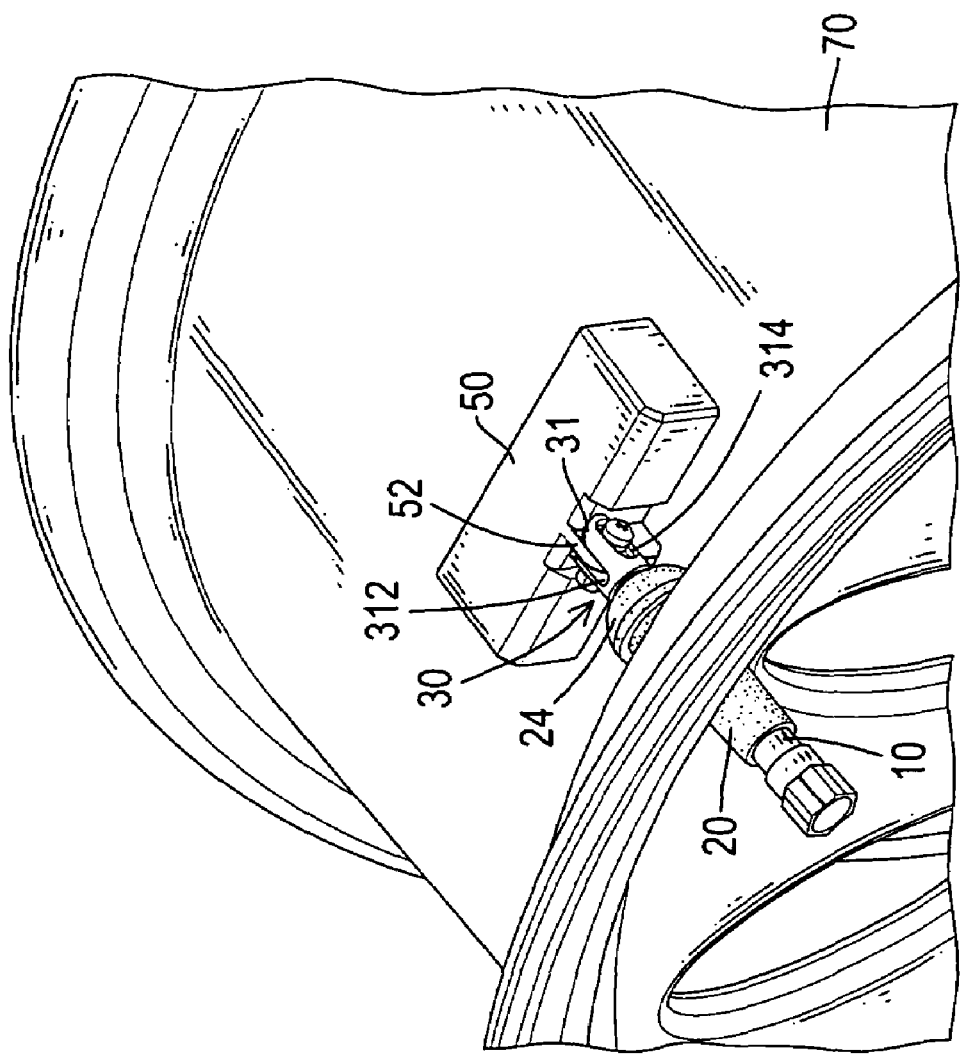
FIG. 1 is a perspective view of a valve stem assembly for tire pressure detecting systems in accordance with the present invention, shown mounted on a car rim.
Figure 2:
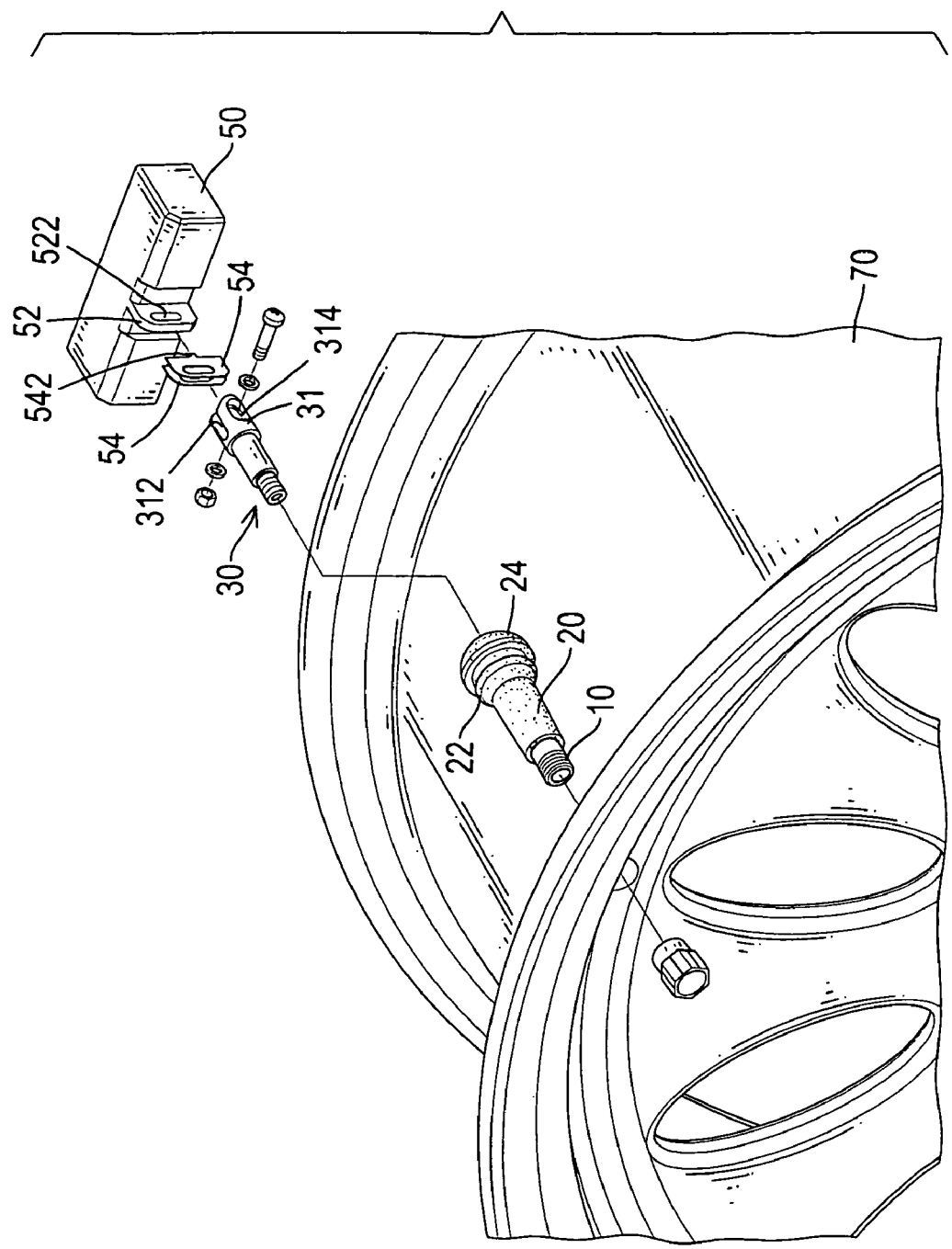
FIG. 2 is an exploded perspective view of the valve stem assembly for tire pressure detecting systems in FIG. 1.

With reference to FIGS. 1, 2, 4 and 5, a valve stem assembly for tire pressure detecting systems in accordance with the present invention has a valve stem (10, 10A), a connector (30, 30A) and a tire pressure detector (50).

The valve stem (10, 10A) is conductive, has an inner end and may have an elastic cover (20) or a fixing nut assembly (60) to securely mount the valve stem (10, 10A) on a car rim (70). Preferably, the valve stem (10) is partially covered by the elastic cover (20). The elastic cover (20) may be formed by rubber, epoxy, silicon rubber or the like and has a cover body (22) and a cover head (24).

Figure 3:
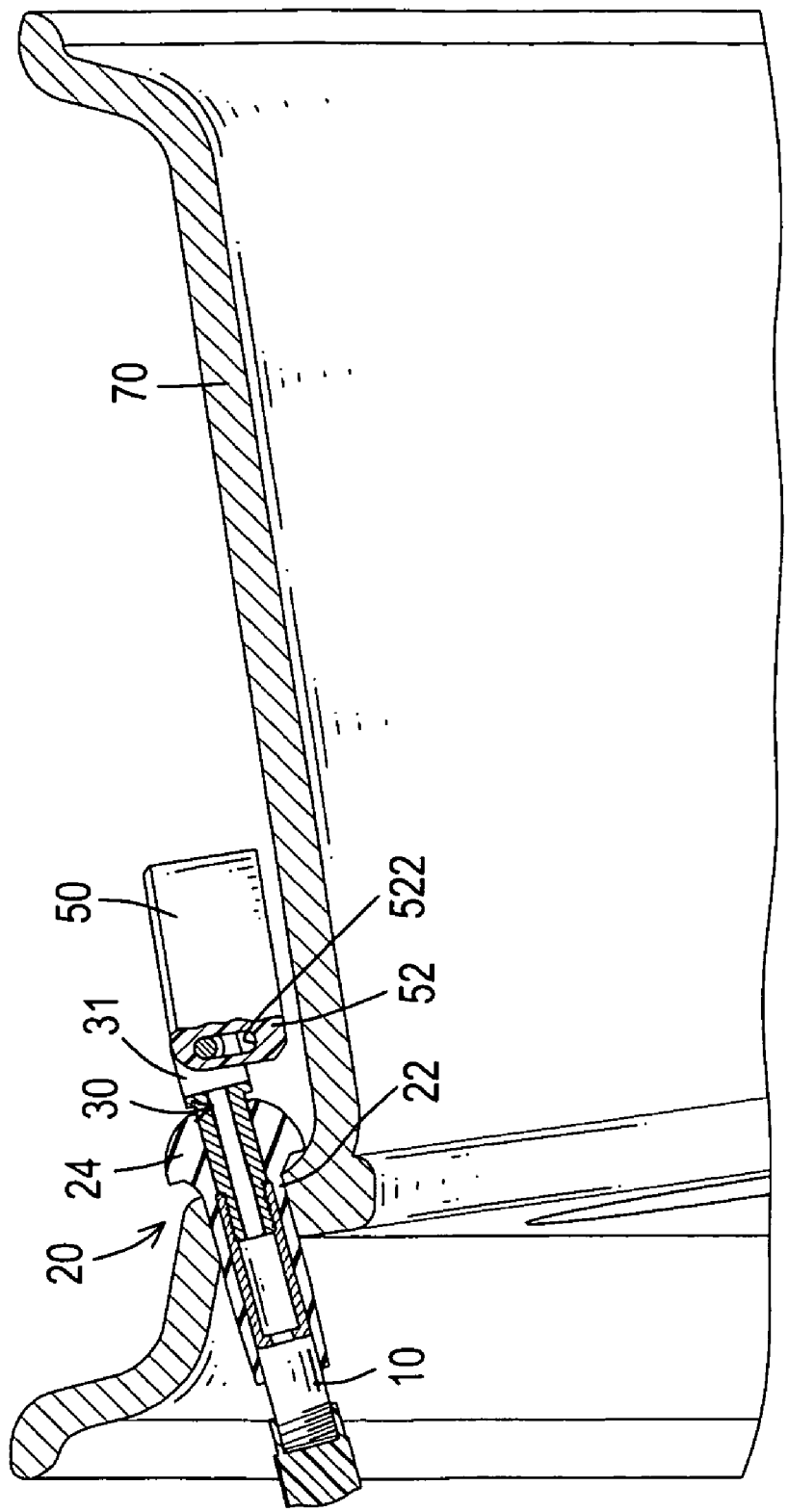
FIG. 3 is a side view in partial section of the valve stem assembly for tire pressure detecting systems in FIG. 1.
Figure 4:
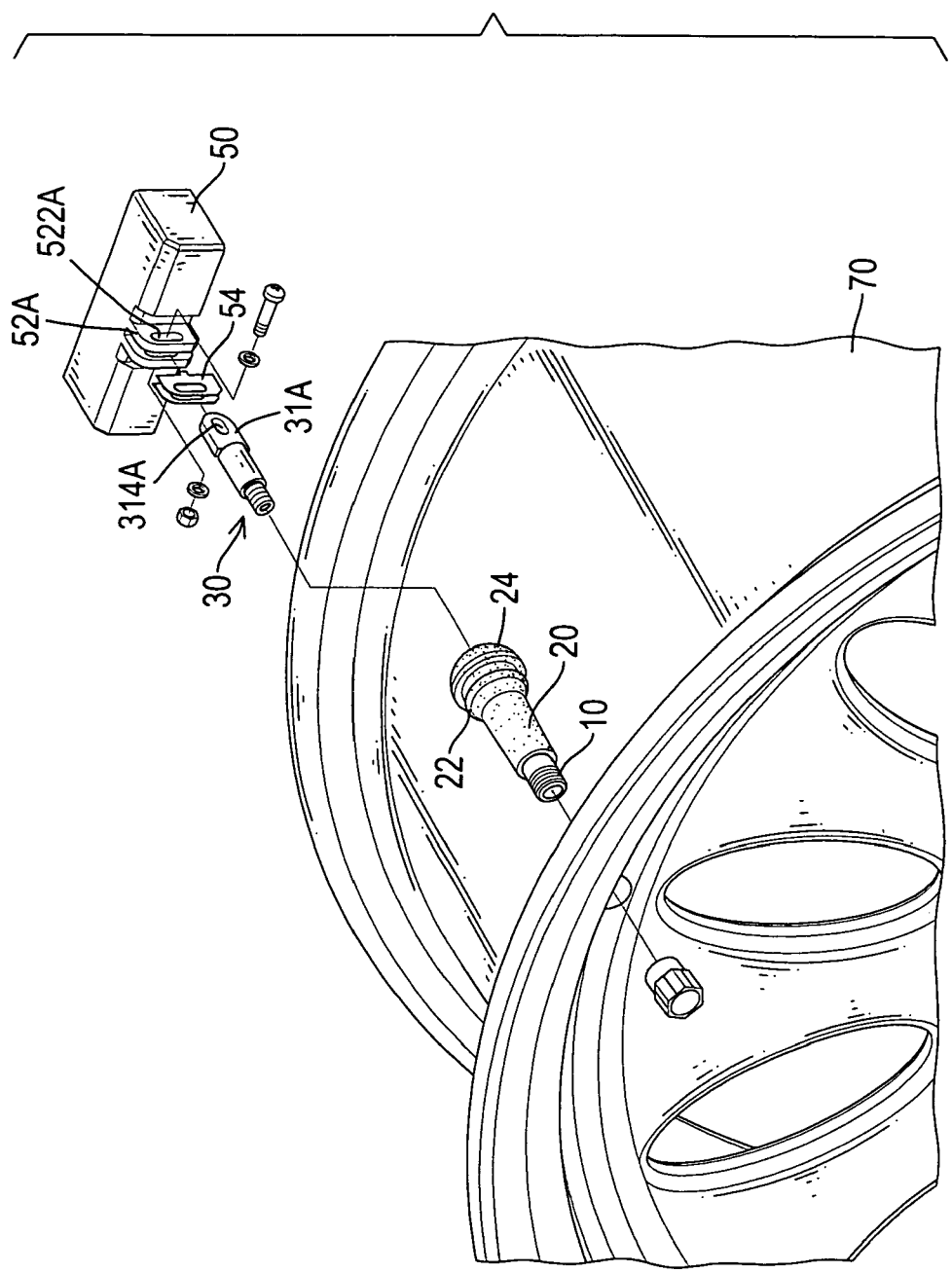
FIG. 4 is an exploded perspective view of a valve stem assembly for tire pressure detecting systems in accordance with the present invention having a flat head connector.
Figure 5:
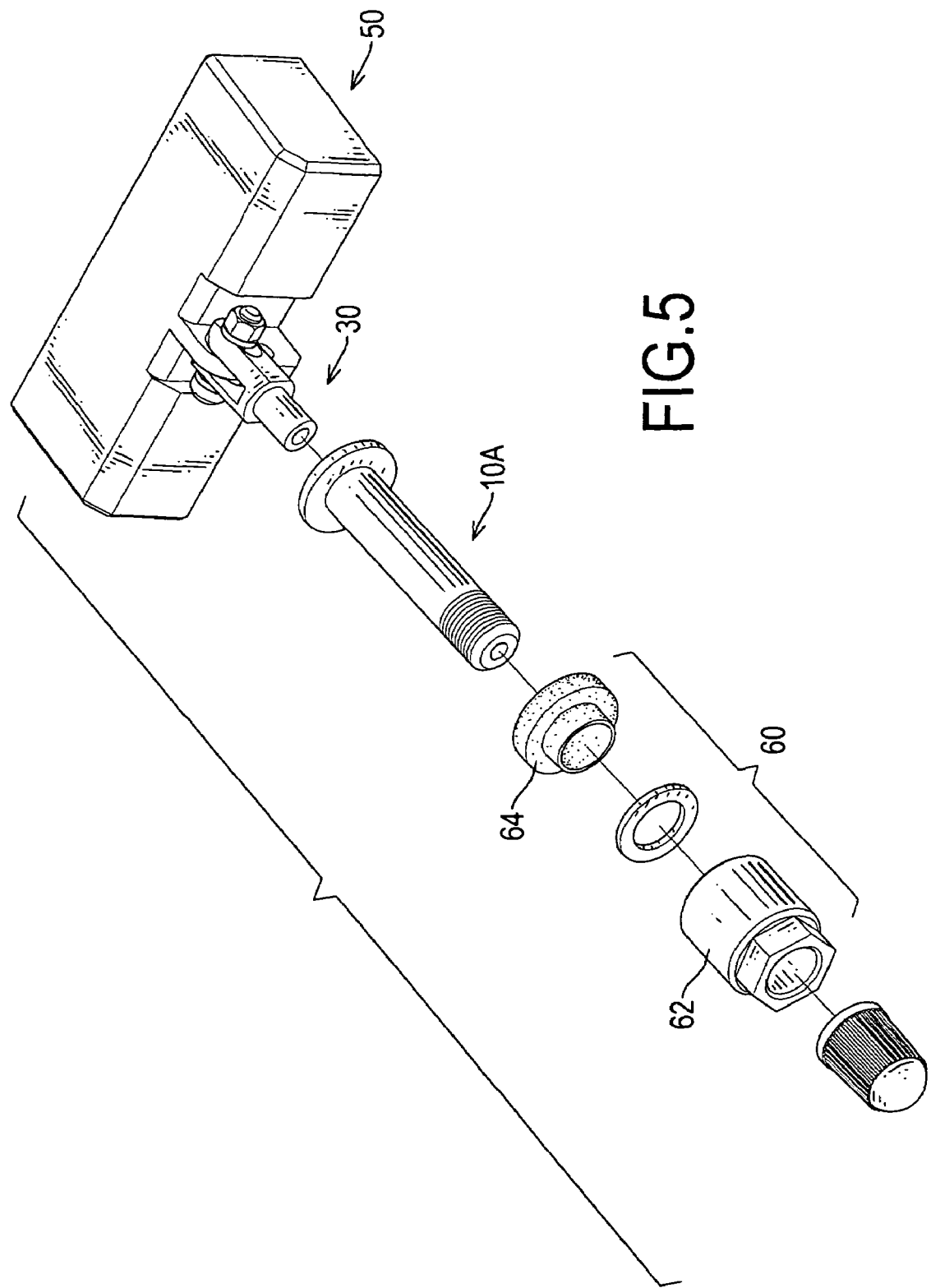
FIG. 5 is an exploded perspective view of a valve stem assembly for tire pressure detecting system in accordance with the present invention having a fixing nut assembly.

The cover body (22) is tubular and is securely mounted over the valve stem (10). The cover head (24) is coaxially formed on the cover body (22) and has a larger diameter to the cover body (22). With further reference to FIG. 3, during assembly, the valve stem (10) with the elastic cover (20) is mounted through and onto the car rim (70) forcing the cover head (24) to deform and seal the elastic cover (20) on the car rim (70).

With further reference to FIG. 6, the valve stem (10A) may have a threaded outer end. The valve stem (10A) is securely mounted on the car rim (70) with using the fixing nut assembly (60). The fixing nut assembly (60) may comprise a nut (62) and a washer (64). During installation, the valve stem (10A) is mounted through the car rim (70), then the washer (64) and the nut (62) are successively mounted on the valve stem (10A) to securely hold the valve stem (10A) on the car rim (70).

The connector (30, 30A) is coaxially attached to the inner end of the valve stem (10, 10A), may be formed on or may be detachably mounted on the valve stem (10, 10A), may be tubular, is conductive and has a connecting section (31, 31A).

The connecting section (31, 31A) has an adjusting slot (314, 314A), may be cylindrical with a domical end, and may have a flat head that may be arced and a clamping slot (312). The adjusting slot (314, 314A) is transversely formed through the connecting section (31, 31A). The clamping slot (312) may be formed transversely through the connecting section (31) in the domical end and is perpendicular to the adjusting slot (314).

Preferably, the connecting section (31) is cylindrical and arced and has the clamping slot (312). The tire pressure detector (50) detects parameters inside a tire and continuously generates and transmits a wireless signal corresponding to detected parameters inside the tire, where the parameters may comprise tire pressure, tire interior temperature, tire rotation speed and the like. The tire pressure detector (50) has at least one tab (52, 52A) and at least one conducting washer (54).

The at least one tab (52, 52A) protrudes from the tire pressure detector (50), corresponds to and is adjustably mounted on the connecting section (31, 31A) and may be a rectangular tab protruding from the tire pressure detector (50) or a pair of paralleling tabs protruding from the tire pressure detector (50). The at least one tab (52, 52A) has a tab slot (522, 522A) and a bolt assembly. The tab slot (522, 522A) is formed transversely through the tab (52, 52A). The bolt assembly is mounted through the tab slot (522, 522A) and the adjusting slot (314, 314A) to secure the tire pressure detector (50) on the connecting section (31, 31A) of the connector (30, 30A). Therefore, a position and tilt angle of the tire pressure detector (50) are adjustable before the bolt assembly holds the tab slot (522. 522A) securely on the connecting section (31, 31A).

Preferably, one tab (52) is implemented corresponding to and being movably mounted in the clamping slot (312).

The tab (52A) may be implemented as two parallelly formed tabs, where the tabs hold the connecting section (31A) therebetween and each tab has a tab slot (522A) formed therethrough. The at least one conducting washer (54) is mounted on the at least one tab (52, 52A), is connected electronically to the connecting section (31, 31A) and has a contact (542). The contact (542) protrudes from the conducting washer (54) and is mounted in and is electronically connected to the tire pressure detector (50). Therefore, the valve stem (10, 10A) may be an antenna for transmitting wireless signals from the tire pressure detector (50). When two tabs (52A) are implemented, the at least one conducting washer (54) is mounted between the tabs (52A). Two conducting washers (54) may be mounted respectively on the tabs (52A) or on opposite sides of the tab (52). As described above, the tire pressure detector (50) may be adjusted to different directions and positions since the tire pressure detector (50) is capable of sliding and rotating along the adjusting slot (314, 314A) before being secured using the bolt assembly.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A valve stem assembly for tire pressure detecting systems comprising
    a valve stem being conductive and having an inner end;
    a connector being coaxially attached to inner end of the valve stem, being conductive and having a connecting section having an adjusting slot, the adjusting slot being transversely formed through the connecting section; and
    a tire pressure detector having
        at least one tab protruding from the tire pressure detector, corresponding to and being adjustably mounted with the connecting section and having
            a tab slot being formed transversely through the tab assembly; and
            a bolt assembly being mounted through the tab slot and the adjusting slot to secure the tire pressure detector on the connecting section; and
        at least one conducting washer being mounted on the at least one tab, being connected electronically to the connecting section and having a contact, the contact protruding from the conducting washer and being electronically connected to the tire pressure detector.

2. The valve stem assembly for tire pressure detecting systems as claimed in claim 1, wherein
    the connecting section has a domical end and is a cylinder having a clamping slot, the clamping slot is formed transversely through the connecting section in the domical end and is perpendicular to the adjusting slot;
    the at least one tab is a tab corresponding to and being movably mounted in the clamping slot.

3. The valve stem assembly for tire pressure detecting systems as claimed in claim 1, wherein
    two tabs are implemented protruding parallelly from the tire pressure detector;
    the connecting section is a flat head and is mounted between the two tabs; and
    the tire pressure detector has two conducting washers being respectively mounted on and between the two tabs.

4. The valve stem assembly for tire pressure detecting systems as claimed in claim 2, wherein the valve stem body has an elastic cover having
    a cover body being tubular and being securely mounted over the valve stem; and
    a cover head being coaxially formed on the cover body.

5. The valve stem assembly for tire pressure detecting systems as claimed in claim 3, wherein the valve stem has an elastic cover having
    a cover body being tubular and being securely mounted over the valve stem; and
    a cover head being coaxially formed on the cover body.

6. The valve stem assembly for tire pressure detecting system as claimed in claim 4, wherein the connector is formed on the valve stem.

7. The valve stem assembly for tire pressure detecting system as claimed in claim 4, wherein the connector is detachably mounted on the valve stem.

8. The valve stem assembly for tire pressure detecting system as claimed in claim 2, wherein the valve stem further has a threaded outer end and a fixing nut assembly, the fixing nut assembly has a washer and a nut being successively mounted on the valve stem.

9. The valve stem assembly for tire pressure detecting system as claimed in claim 3, wherein the valve stem further has a threaded outer end and a fixing nut assembly, the fixing nut assembly has a washer and a nut being successively mounted on the valve stem body.

10. The valve stem assembly for tire pressure detecting system as claimed in claim 8, wherein the connector is coaxially formed on the valve stem.

11. The valve stem assembly for tire pressure detecting system as claimed in claim 9, wherein the connector is detachably mounted on the valve stem.

\* \* \* \* \*